May 23, 1933.  F. A. VALENTINE  1,911,006
RESETTING MECHANISM FOR TESTING MACHINES
Filed March 22, 1930   2 Sheets-Sheet 1
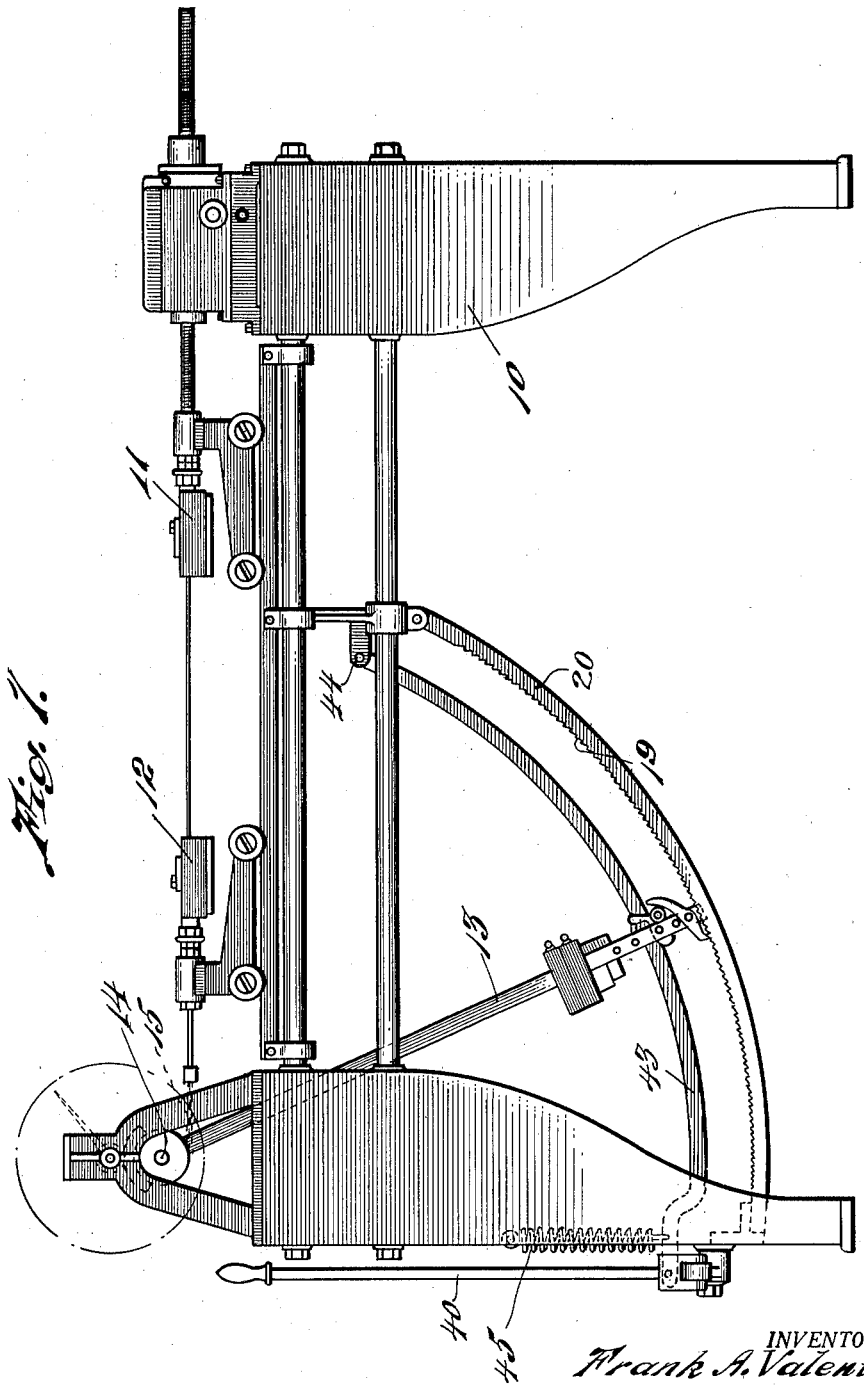
INVENTOR.
Frank A. Valentine
BY Barlow & Barlow
ATTORNEYS.

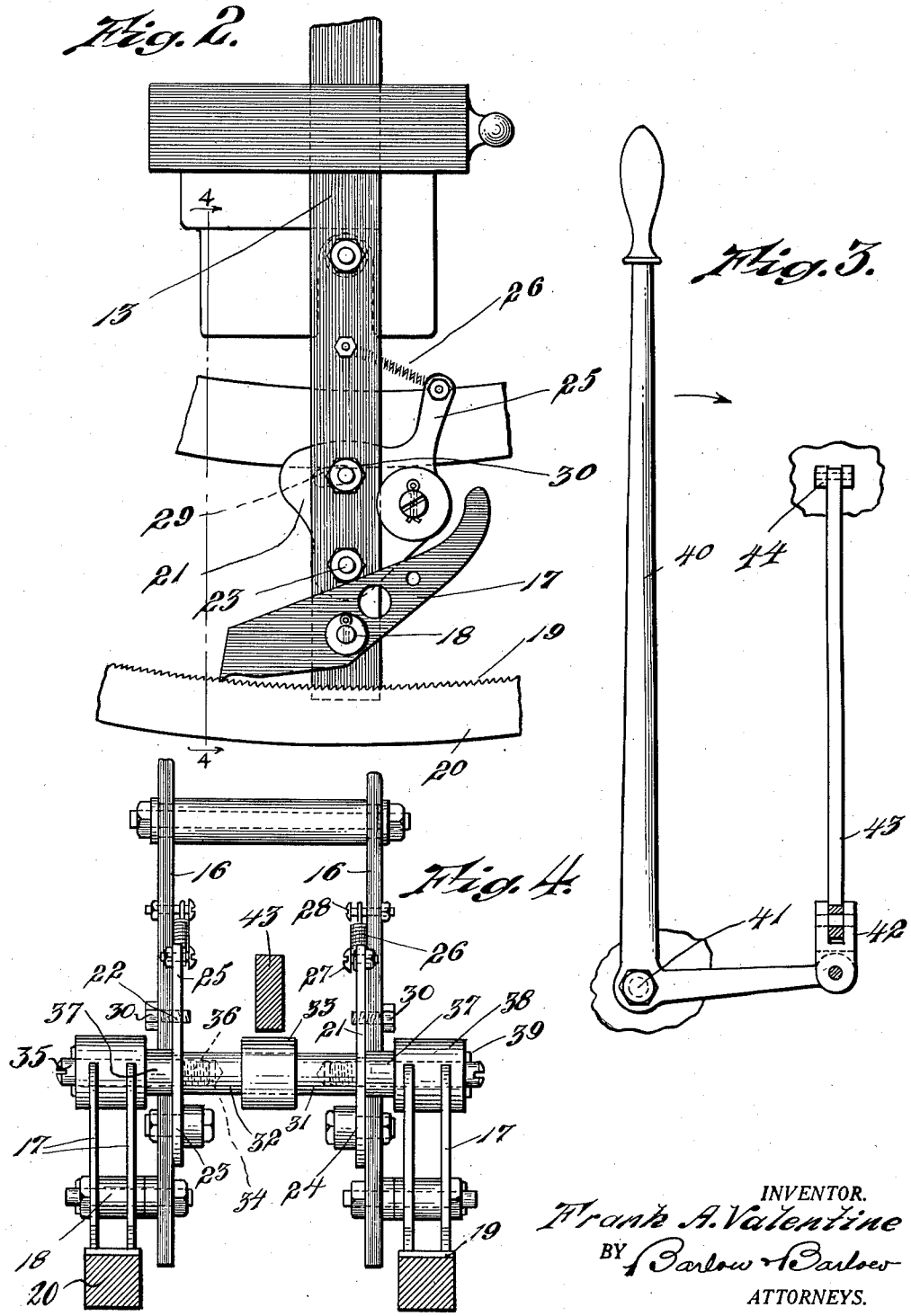

Patented May 23, 1933

1,911,006

UNITED STATES PATENT OFFICE

FRANK A. VALENTINE, OF APPONAUG, RHODE ISLAND, ASSIGNOR TO HENRY L. SCOTT COMPANY, OF PROVIDENCE, RHODE ISLAND, A CORPORATION OF RHODE ISLAND

RESETTING MECHANISM FOR TESTING MACHINES

Application filed March 22, 1930. Serial No. 438,102.

My present invention relates to testing machines equipped with movable weight arms, and has particular reference to resetting mechanism for bringing the weight arms to initial testing position.

One object is to simplify the construction of a brake control for resetting the weight arm.

Another object is to permit controlled brake movement of the weight arm to its initial position.

A further object is to automatically permit relatching of the weight arm pawl on release of the brake control.

With these and other objects and advantageous features in view, the invention consists of a novel arrangement of parts more fully disclosed in the detailed description following, in conjunction with the accompanying drawings, and more particularly set forth in the appended claims.

In the drawings:

Fig. 1 is a front elevation of a horizontal testing machine equipped with the novel resetting mechanism;

Fig. 2 is an enlarged detail of the latching pawl and the control therefor;

Fig. 3 is a view of the resetting lever and its associated brake rod, looking at the lever from the left of Figure 1; and Fig. 4 is a view, partly in section, on the line 4—4 of Figure 2.

It has been found desirable to use a latching and a resetting mechanism for the weight arms of testing machines which will ensure accuracy of latching, will reduce the dead weight of the weight arm and thus increase the accuracy of the test readings, and will permit rapid, controlled return of the weight arm to its initial position. I have therefore pivoted a series of aligned pawls on the weight arm which cooperate with arcuate toothed sectors, and have pivotally mounted a movable control mechanism on the weight arm which is engageable by a manually controlled brake rod to both release the pawls and brake the descending weight arm; and the following is a detailed description of a preferred construction embodying the principles of my invention.

Referring to the drawings, the testing machine 10 has the usual movable power jaw 11, movable resistance jaw 12, and weight arm 13, the weight arm being pivotally mounted on the pivot shaft 14, which is positively connected to the resistance jaw by a flexible chain 15 or the like. The weight arm is preferably formed of two parallel bars 16 which are bolted or secured together in any desired manner, a plurality of pawls 17 are pivotally mounted on pins 18 secured to each bar, the pawls being gravity actuated for locking engagement with the teeth 19 of aligned fixed arcuate latch bars 20. Preferably, the practically horizontal portions of the latch bars have no teeth, thus permitting a free setting of the weight arm, and ensuring an appreciable test tension before the pawls engage the teeth.

A movable plate 21, 22 is pivotally mounted on each weight arm bar at 23, 24 in proximity to the pawls 17, each plate having an extension 25 to which a tension spring 26 is secured, as by a bolt 27 or the like, the other end of the spring being secured to a bolt or the like 28 secured to the adjacent weight arm bar. The plates 21, 22 each have a slot 29 in the upper portion thereof and are limited in movement by bolts 30 which are attached to the bars 16 and pass through the slots 29.

A transverse roller bearing rod 31 is formed in three parts, the center part 32 fitting between the plates 21, 22 and carrying a brake roller 33, and having screw threaded axial recesses 34 at the ends for receiving the screw threaded ends 36 of two pins 35; spacing collars 37 are provided on each pin 35, and pawl rollers 38 are mounted on each pin and locked in position by cotter pins 39 or the like, in adjacency to the arcuate upper ends of the pawls 17.

Referring to Figures 1 and 3, a resetting lever 40 is pivotally mounted in the machine frame as at 41, the arm 41 having a bifurcated offset 42 at its ends in which an arcuate brake rod 43 is pivoted, the other end of the brake rod being pivoted to the machine frame, as at 44. A tension spring 45 secured to the machine frame normally holds the brake rod upwardly and away from the brake roller 33.

The operation of the improved resetting control may now be described:

Considering Figure 1, the test specimen is clamped between the two jaws 11 and 12, and power is applied to the power jaw 11. The strain on the test specimen is therefore communicated to the resistance jaw 12, which turns the weight arm shaft 14 through the medium of the flexible chain 15, and lifts the weight arm 13 in direct proportion to the power exerted on the power jaw 11, the weight on the weight arm being adjusted by adding or removing weights to give the desired resistance. As the weight arm 13 is lifted, the pawls 17 shift so as to continually lock the weight arm against return movement. When the test specimen breaks, or the test is otherwise concluded, the weight arm 13 is in an elevated position and locked against return movement by engagement of the pawls 17 with the teeth 19. To reset the weight arm to its initial position, the resetting lever 40 is turned in the direction indicated by the arrow in Figure 3, thus moving the brake rod 43 downwardly into engagement with the brake roller 33. The downward movement of the brake roller 33 is communicated to the associated pawl rollers 38 which engage with the upper ends of the pawls 17 and release the pawls. The weight arm is thus free to shift downwardly, but the movement of the brake rod 43 on its pivot 44 has resulted in a continuously decreasing distance between the brake rod and the brake roller, the plates 21 being shifted against the tension of the springs 26 until the slots 29 have engaged with bolts 30 to limit the relative movement of the plates 21 and 22. In this position, the brake roller is firmly pressed against the brake rod, and the descent of the weight arm is stopped, even though the pawls 17 are lifted out of locking position. A slight return movement of the lever 40 permits a slow movement of the weight arm to its initial position, the brake rod and brake roller being continually in engagement and the pawls 17 remaining in unlocking position; if the lever 40 is released too much, the plates 21 and 22 are turned by the springs 26, thus freeing the pawls 17 to again engage the teeth 19 under the influence of gravity.

The improved construction therefore permits a very simple and efficient braking control for resetting the weight arm to its initial position; in addition, a reduction of the weight required for the resetting and latching devices is obtained by reducing the number of parts required, thus lessening the dead weight at the end of the weight arm and increasing the accuracy of the recorded test data.

While I have described a specific construction which utilizes the principles of my invention, it is obvious that desired changes in form, in arrangement, and in proportion may be made, without departing from the spirit and the scope of the invention as defined in the appended claims.

I claim:

1. In a testing machine, a movable weight arm, a pawl pivoted on said arm, a toothed latch bar cooperating with said pawl, a plate pivotally secured to said weight arm and also having a pin and slot connection with said arm, yielding means resisting movement of said plate, a releasing roll mounted on said plate and engageable with said pawl to release the same, a brake roller mounted on said plate, and a brake rod engageable with said brake roller and adapted to move both of said rollers against said yielding means.

2. In a testing machine, a movable weight arm, a pawl pivotally mounted thereon and having an extension, a toothed latch bar cooperating with said pawl, a plate pivotally mounted on said weight arm, means for limiting the pivotal movement of said plate, a pawl releasing roller secured to said plate and adapted to engage the extension of the pawl, a brake roller secured to said plate, and a single movable brake rod adapted to engage said brake roller and turn said plate to release the pawl and at the same time receive the pressure of said rod to retard the movement of the rod, said pressure being the sole braking action caused by the movement of said brake roller.

3. In a testing machine, a movable weight arm, a pawl pivotally mounted thereon and having an extension, a toothed latch bar cooperating with said pawl, a member pivotally mounted on said weight arm, a pawl releasing roller secured to said member and adapted to engage the extension of the pawl, a single brake roller secured to said member, a single movable brake rod adapted to engage said brake roller and turn said member to release the pawl, and means on said weight arm for limiting movement of the member whereby the brake roller receives pressure of said movable brake rod to retard the action thereof, the pressure received between said rod and roll being the sole braking action applied to said movement.

4. In a testing machine, a movable weight arm, a pawl pivotally mounted thereon and having an extension, a toothed latch bar cooperating with said pawl, a plate pivotally mounted on said weight arm, a pawl releasing roller secured to said plate and adapted to engage the extension of the pawl, a brake roller secured to said plate, a spring secured to said plate and normally urging said plate to maintain said pawl releasing roller away from said extension, a movable brake rod adapted to engage said brake roller and turn said plate against the tension of the spring to release the pawl, and means on said weight arm limiting the turning movement of said plate.

5. In a testing machine, a movable weight arm comprising spaced bars secured together, pawls pivotally mounted on said bars, toothed latch bars of arcuate form cooperating with said pawls, plates pivotally mounted on said spaced bars, a transverse rod secured to and passing through said plates, a brake roller mounted on said rod between said plates, pawl releasing rollers mounted on said rods and engageable with said pawls on downward movement of said plates to release said pawls, springs normally urging said plates upwardly, said plates and spaced bars having cooperating slot and pin connections limiting the downward movement of said plates, and a brake rod of arcuate form positioned between said spaced bars and manually movable to engage said brake roller and move said plates downwardly against the tension of said springs.

In testimony whereof I affix my signature.

FRANK A. VALENTINE.